April 4, 1950  H. WATERMAN  2,502,495

APPARATUS FOR COPPER PLATING

Filed June 29, 1946  3 Sheets-Sheet 1

INVENTOR:
HERBERT WATERMAN.
BY
Hebner, Matthy & Beehler
ATTORNEYS.

April 4, 1950 H. WATERMAN 2,502,495
APPARATUS FOR COPPER PLATING
Filed June 29, 1946 3 Sheets-Sheet 2

INVENTOR:
HERBERT WATERMAN.
BY
Liebner, Maltby & Beehler
ATTORNEYS.

Patented Apr. 4, 1950

2,502,495

UNITED STATES PATENT OFFICE 2,502,495

APPARATUS FOR COPPER PLATING

Herbert Waterman, Los Angeles, Calif., assignor to Norris Stamping and Manufacturing Company, Los Angeles, Calif., a corporation Application June 29, 1946, Serial No. 680,376

3 Claims. (Cl. 204—237)

My invention relates to an apparatus for electroplating a layer of copper on the bottom of stainless steel cooking utensils primarily to improve the heat distribution on the inside bottom surface of the utensil.

The use of stainless steel in cooking utensils has many advantages. Stainless steel does not corrode when used in the preparation of foods. It is easily cleaned and is conveniently maintained in a sanitary condition. Its surface has an attractive appearance which is readily maintained. Due to the high strength and other excellent physical properties of stainless steel, thinner gage metal may be used for a utensil of a given size than is possible with other metals, while still retaining the desired rigidity. As a result, stainless steel cooking utensils are lighter than those of most other metals with the same strength. A light kitchen utensil is much preferred by the housewife to a heavy utensil, particularly in its performance in the preparation of food is good.

Heretofore, the principal drawback to the wider use of stainless steel utensils is the irregular heat distribution on the inside cooking surface. This is caused by the high thermal resistance of stainless steel, which is about twenty-five times that of copper and fifteen times that of aluminum. As a result of this high thermal resistance, heat is not transferred along the bottom of the utensil rapidly enough to prevent the formation of "hot spots." When the applied heat is in the form of a large number of small gas flames, the spots immediately above these flames on the inside of the utensil reach a much higher temperature than the adjacent areas, which must get their heat by conduction from these "hot spots." When electric heat is used, a somewhat higher uniformity results, but this is still not sufficient to provide a substantially isothermal inner surface.

In order to increase high lateral conductivity in a stainless steel kitchen utensil, the art long ago developed a utensil the bottom of which is covered with a layer of copper. This layer, generally of the same thickness as the stainless steel used, provides a lateral path of high thermal conductivity for the transfer of heat from the points of application, and results in a fairly uniform temperature distribution on the inner surface of the bottom of the utensil.

Many methods were developed for applying the layer of copper to the bottom of the utensil. Such methods include such procedures as spraying copper on the utensil, welding a sheet of copper to the bottom of the utensil, spinning a copper circle in a recess in the bottom, or depositing the copper layer by electroplating. It is the general opinion that a properly electroplated copper layer deposited on a suitably prepared stainless steel surface is likely to be anchored more firmly and more intimately than a layer prodced by any other method. It is important to be certain that the two layers are well joined, since the bi-metallic thermal stresses are considerable, and any separation decreases materially the benefits of the copper layer.

Based on this general opinion, the efforts of many inventors were directed to the best means of applying electroplated copper layers directly on the bottom of the utensils. While it is an easy matter to deposit thin layers of copper, of the order of a few thousandths of an inch, which are uniform in thickness and free from inclusions or irregular growths in spots, the deposition of about twenty-five thousandths of an inch or more of copper, which is desirable, is a relatively difficult task. If low current densities are used, a fairly smooth and sound deposit may be readily obtained, making the plating time excessively long, thus requiring a large capital expenditure in the plating equipment for the desired production volume. When high current densities are used, the deposit becomes relatively imperfect. Irregular growths of copper, known as trees, are formed in many places, particularly in the region of current density concentration or where the potential gradients are high. This is usually the case at the center of the bottom, and at the edge, where the horizontal bottom surface joins the vertical side surface.

The usual solution of this problem of plating at high current densities has been to rotate the utensil at a high speed while plating, and, at the same time, to agitate the electrolyte by any one, or by a combination of, well-known means, such as compressed air, stirring, rapid movement of the electrolyte or the like. Even then suitable provisions must be made for fairly complicated masking means to insure an adequately uniform distribution of copper over all of the bottom.

When a utensil is rotated about its vertical axis, the center of the utensil is stationary. The velocity of any point on the bottom of the utensil is directly proportional to its distance from the center. Thus the resulting agitation of the electrolyte immediately adjacent the bottom of the utensil varies linearly from the center of the periphery. This variable velocity accounts in part for the non-uniform and erratic results normally obtained by this method.

In the disclosures of the prior art, the utensil is rotated rapidly with its bottom horizontal. A circular anode is placed in juxtaposition to the bottom of the utensil. The anode is attached firmly to the bottom of the tank, or to an anode holder by mechanical means to assure an adequate electrical connection. Since an average size utensil may require as much as one half or more pounds of copper, it becomes necessary to renew the anode after a few utensils are plated. This change of anodes is fairly complicated, requiring the draining of the tank of its contained electrolyte, and the removal of the unused anode scrap. A new anode is then attached. There is a good deal of scrap produced in the manufacture of the original anodes, and in plating. This scrap has to be disposed of at a lower price than the purchase cost of the copper. The cost per pound of deposited copper is thus much higher than would be the case if all of the copper anodes could be used up completely. In addition, the saving of labor would be considerable in the second case.

A primary object of this invention is to provide a new method of and apparatus for plating copper on the bottom of stainless kitchen utensils which does not require complicated installation with motors for the rotation of the utensils, the use of complex masks to obtain uniformity of the deposit, and, at the same time, will permit the complete utilization of the copper anodes, preferably in the form of inexpensive copper scrap, without requiring a firm mechanical or electrical connection between the copper anodes and the positive pole of the generator circuit.

Another object of the invention is to provide novel means and a method for copper plating a vessel to obtain a better bond, obtain greater uniformity of thickness and a smoother surface and form unspotted side walls.

Other objects and advantages will appear and be brought out more fully in the following specification considered with reference to the accompanying drawings throughout which like parts are designated by like numerals.

Figure 1:
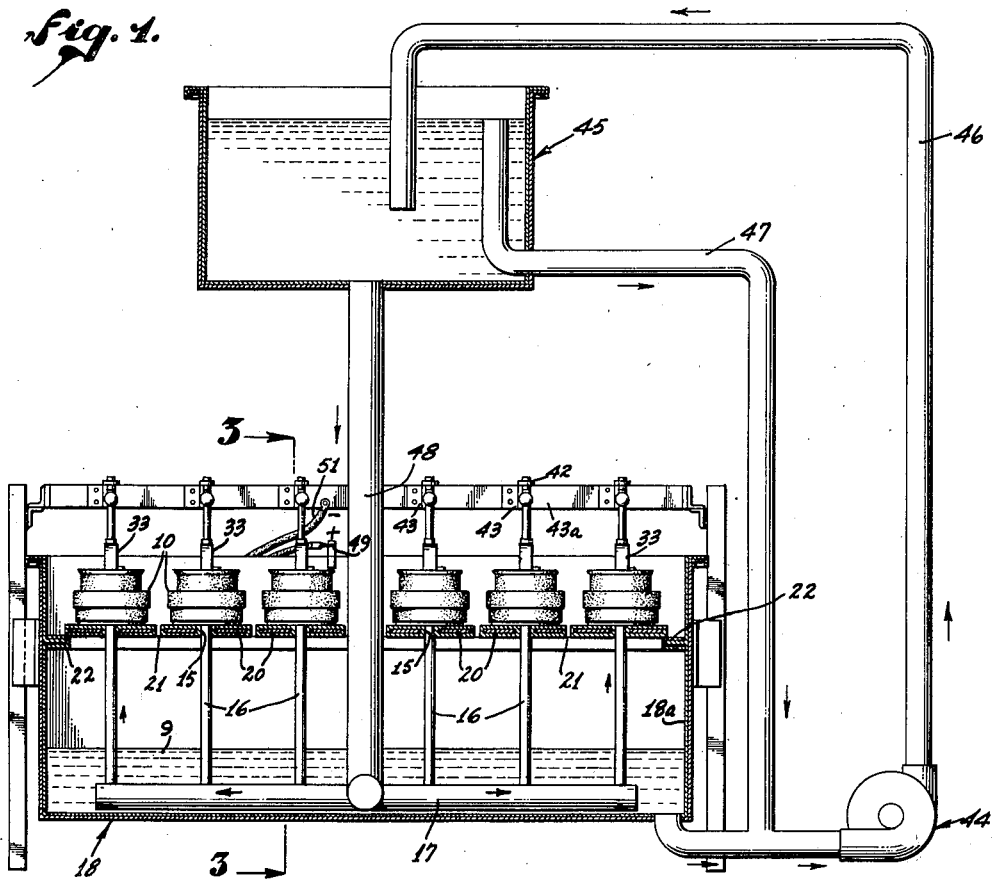
Figure 1 is a sectional elevation view of a tank which may be used in practicing my invention showing the circulating system for the flow of the electrolyte.
Figure 3:
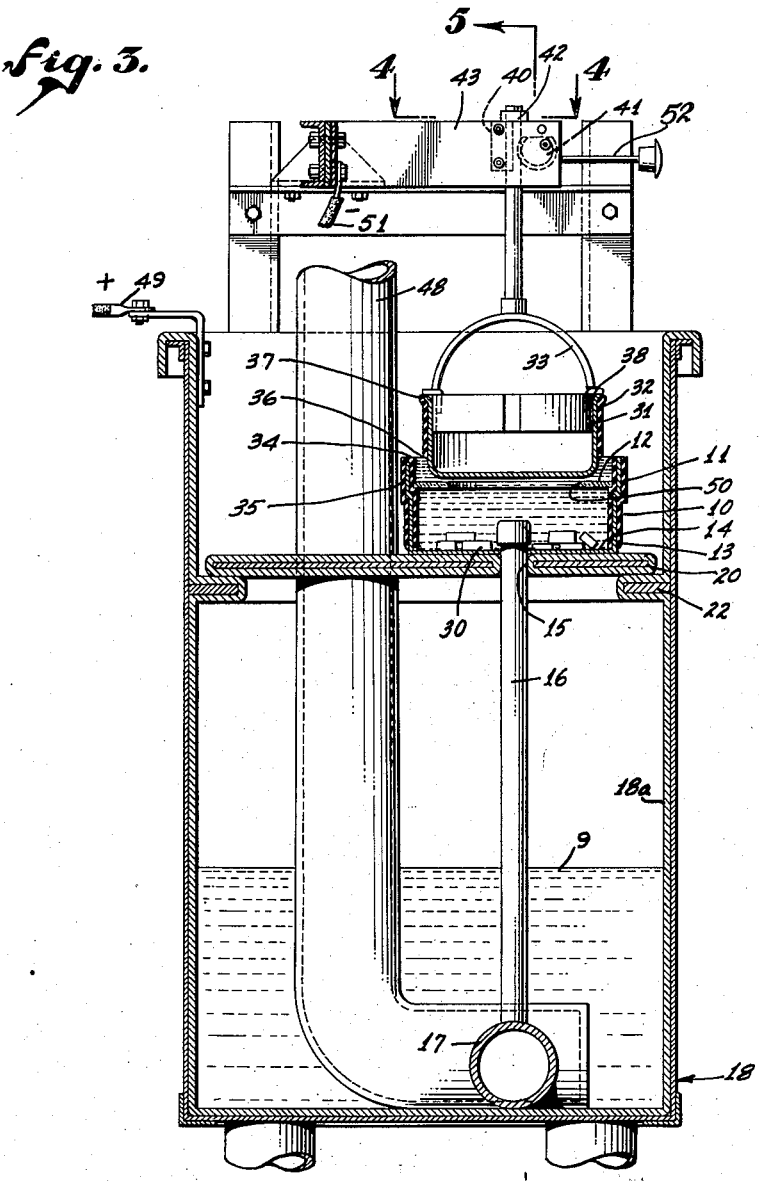
Figure 3 is an enlarged sectional view taken along line 3—3 of Figure 1 with additional details, illustrating one of the plating stations.
Figure 4:
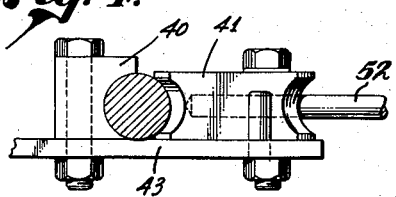
Figure 4 is an enlarged fragmentary section taken on line 4—4 of Figure 3.
Figure 5:
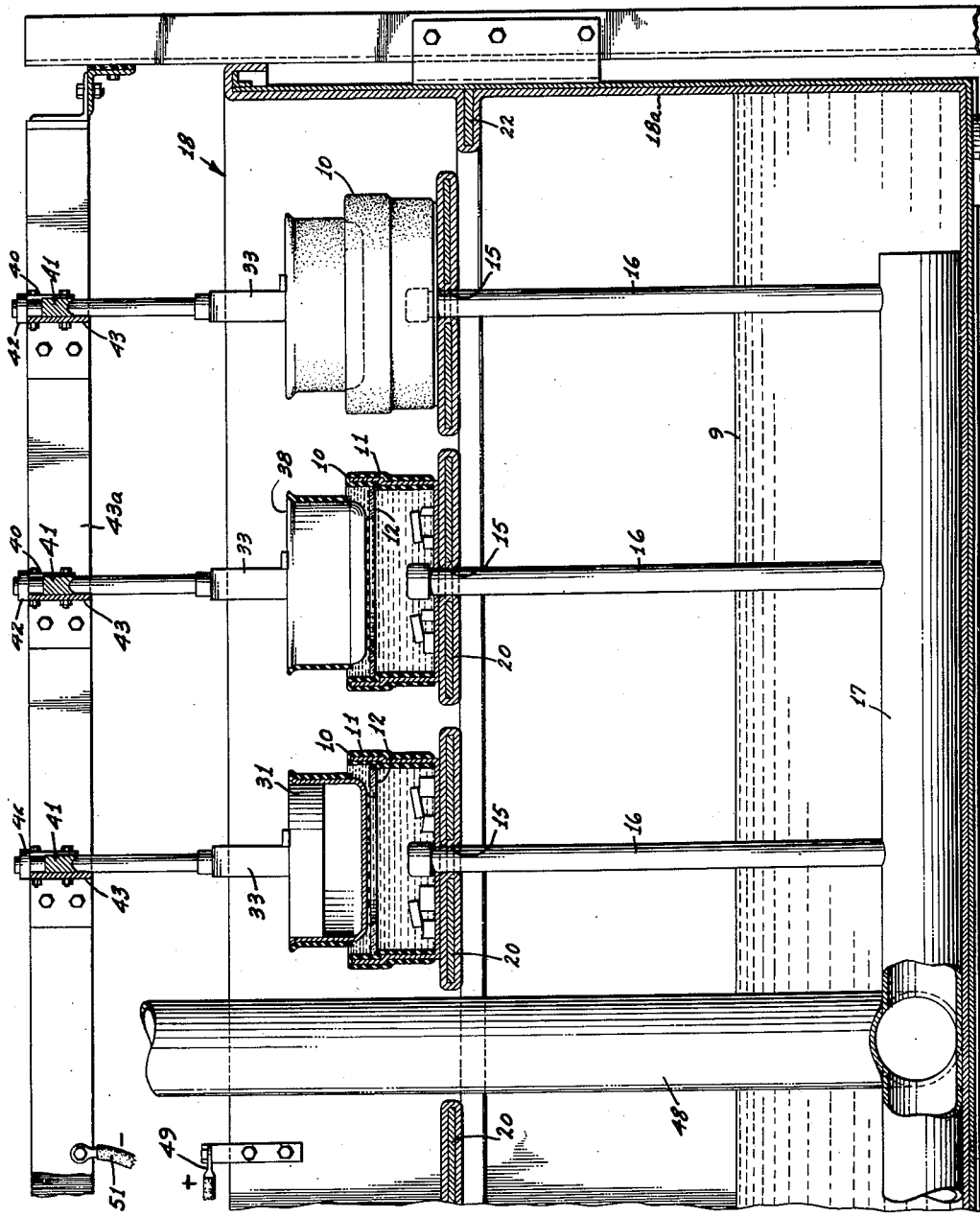
Figure 5 is a further enlarged partial section taken along the line 5—5 of Figure 3.

A number of utensils may be plated at one time in a plating installation, which is made up of a number of identical plating stations. A typical station is shown in Figure 3. A complete installation with a number of stations is shown in Figure 1.

The principal element of each plating station is a metal cylinder 10. This cylinder may be made of lead by any desired fabricating method, such as spinning, casting or burning. Nearer to the top edge of the cylinder than to its bottom there is an offset 11 defining an annular shoulder, used to support an insulating shield 12 when such shield is required. The vertical walls of cylinder 10 are coated both on the inside and out with a suitable insulating layer 13 of rubber or the like. The bottom 14 of each cylinder 10 is bare lead. Each cylinder bottom 14 has an opening 15 through which extends a stand pipe 16 which is preferably made of lead. Each stand pipe 16 extends into its respective cylinder 10 a short distance above the bottom. The joint between stand pipe 16 and the bottom of cylinder 10 is made liquid tight, either by lead burning or by the use of gaskets or otherwise, as desired.

Stand pipes 16 are attached at their lower ends to a manifold 17 which may be a lead pipe extending along the bottom of a tank 18, preferably of steel, and provided with a liner 18a of lead.

The cylinders 10 are each supported on a horizontal plate 20 made of steel coated on both sides with lead. There are spaces 21 between adjacent plates 20 to permit complete and rapid draining of the electrolyte 9 overflowing from cylinders 10 to the lower portion of tank 18. Plates 20 are supported on brackets 22 a considerable distance above the bottom of tank 18, so that when all of the electrolyte in the circuit is drained into tank 18, its level will be below the plates 20. Tank 18, plates 20, and cylinders 10 are all in good electrical contact, and are connected to the grounded, positive conductor 49 of any suitable source of direct electric current. On the bottom of the cylinder 10 are placed pieces of copper 30 which serve as the anode copper, which goes into solution to replenish the concentration of copper in the electrolyte used for plating.

The cooking utensil 31 with its mask 32 is suspended from a metallic holder 33 in such a manner as to center the utensil in the cylinder 10, and to locate the horizontal position of the utensil so that the lower edge of the mask 32 is some distance below the upper edge 34 of the rubber coating 35. Mask 32 is a close fitting outer rubber sleeve and serves to limit the extent to which the outer wall of the utensil can be plated. The electrolyte 9, when pumped as described hereinafter, fills cylinder 10 and overflows the edge 34 of the cylinder. The electrolyte 9 flows upwardly from manifold 17 through each stand pipe 16 into a cylinder 10, filling the same and immersing the bottom of the utensil 31 therein, and then flows radially outwardly and upwardly through the annular passage between the utensil and the cylinder to the edge 34 of the cylinder, overflows that edge past plate 20, and then passes downward into the lower portion of the tank 18.

Each holder 33 is adjustably supported by a locating bracket 40 against which it is held by means of an eccentric clamp 41, and is positioned as to height by an adjustable ring or screw 42. A rod or handle 52 actuates clamp 41 to a holder releasing position. Bracket 40 is made of copper and is attached to a bar 43 which is connected to a bus bar 43a supported on but insulated from tank 18 and electrically connected to the negative conductor 51 of the source of electricity. The electrolyte 9 is taken from the tank 18 by means of a suitable pump 44 which pumps it upward to a gravity tank 45 by a pipe 46. Gravity tank 45 has an overflow pipe 47 which allows any excess of the electrolyte 9 to overflow through return pipe 47 to the tank 18. Tank 45 is also connected through a pipe 48 to the manifold 17. All the piping and the pump are so proportioned as to assure a constant head on the manifold 17, and thus provide a constant flow through each of the stand pipes 16 into each cylinder 10.

The structure just described prevents any significant flow of current from the anodic plate 20 on the outside of the cylinder 10 to the edge of the mask on the utensil. The growth of trees of copper at that point is thus prevented and the desired uniformity of the plated copper is assured. When the diameter of the utensil plated is about three inches less than the inner diameter of the cylinder 10, no shield 12 need be used placed on the offset 11 in the vertical walls of the cylinder 10. For utensils of a smaller diameter, it is desirable to use the shield 12, which is made of an insulating material of sufficient thickness to remain flat, and is simply a disc with a hole 50 at its center. It is an easy matter to determine experimentally the diameter of this hole 50 to assure a uniform deposit within any desired limits.

A number of these plating stations described in connection with Figure 3 are shown in Figure 1. It is generally convenient to arrange them in two rows in a staggered pattern so that the cylinders of the first row lie displaced about one half of the distance between cylinders of the second row. This arrangement reduces the size of the tank 18, and facilitates handling. The electrolyte, overflowing the edges 34 of each of the various cylinders 10 should be allowed to run down the outer wall of its own cylinder without much mixing with that of other cylinders. In this way, electrically, each cylinder 10 acts as its own plating station and is not affected by the presence of the other cylinders. The disclosed arrangement permits the plating of various diameters or sizes of utensils at the same time in the different stations. All that is required is the placement of the proper shield 12 on the offset 11 of the cylinder 10, and the use of the proper sized holder. This is a great convenience, since the trade requires the simultaneous availability of a large variety of utensil sizes and diameters.

Unlike the prior disclosed art, the possibility of using irregular pieces of copper placed on the bottom of the cylinders as the anode material without making any firm mechanical connection is of tremendous value in lowering substantially the costs and increasing the quality of the utensils. The rejects resulting from plating when the anodes are not of correct size and diameter, or are excessively corroded, are now fully eliminated.

The mask 32 is made in accordance with the teaching of the current art. The lower edge 36 of mask 32 should tightly contact the utensil in such a manner as to prevent any plating under it at any point. The upper edge 37 of the mask 32 should be placed at a suitable distance from the edge 36 so that when the mask is positioned properly against the bead 38 of the utensil 31, the vertical deposit of copper is of correct height above the bottom.

The acid copper sulfate electrolyte used for plating is well known to the art. Its composition is so selected as to give a low value of specific resistance. This composition is automatically maintained at the optimum value by suitable proportioning of the area of the bottom of the cylinder 10 covered with copper pieces or left open as lead area. Then neither the production of acid (produced by plating out of too much copper compared with the amount dissolved) nor the increase in the copper concentration with the accompanying reduction in the free acid content results.

The deposition of copper at high densities is best carried out at relatively high temperatures—over 120° F., but preferably not in excess of 135° F. This temperature is maintained by any suitable means, such as a steam coil and thermostat (not shown). As a rule, the distance between the bottom of the utensil 31 and the bottom of the cylinder 10 is about six inches. A substantial portion of the total heat required for maintaining the temperature of the electrolyte is furnished by the drop in potential through the electrolyte, with the electrical energy converted into heat due to the electrolyte resistance.

Figure 2:
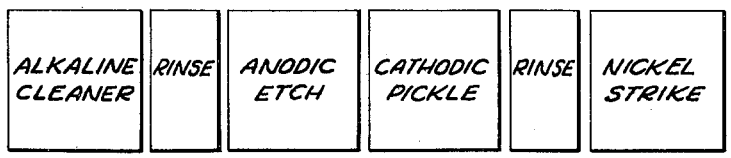
Figure 2 is a schematic representation of the steps taken in preparation of the articles to be plated.

The stainless steel utensil is prepared for plating in accordance with well-known prior art practice. After cleaning, its surface is etched suitably by the steps shown in Figure 2 by reading from left to right. It is preferred to deposit a flash coating or thin layer of nickel immediately after etching, or while etching, to prevent the oxidation of the freshly etched surface of stainless steel. In this manner, well adherent deposits of copper may be assured.

The elimination of stray currents, normally present in all the published or known embodiments of plating stations of the prior art, results in a simple plating arrangement, of totally unexpected performance, where the quality and uniformity of the resulting deposit is very high. This may be attributed, perhaps, to the substantially vertical paths of current carrying the copper ions to the utensil, resulting in a uniform current density over all of the bottom of the utensil. In addition, the high velocity horizontal current of the liquid radially outward along the bottom of the utensil produces excellent agitation, so that polarization is substantially eliminated. It is found that at least twenty gallons per minute, and preferably thirty gallons or more per minute, should be allowed to flow from each stand pipe 16 for plating of utensils up to ten quarts in size, the usual upper range of domestic cooking utensils.

This agitation appears to be such as to not require any additional provision for the reduction of the polarization as, for example, the rotation of the pot. Unlike other means of agitation, this preferred mode is more economical than when separate stirring or compressed air is used. The agitation is provided here where it is needed and nowhere else.

In actual practice the size of the pipe used as a vertical stand pipe determines the flow of the electrolyte with a given head pressure. For example, with a 1" I. D. pipe and a six foot head with the electrolyte used, 31 gallons per minute is discharged practically independently of the shield and the utensil used. This is the result of the fact that the principal resistance to the flow is in the vertical pipe and other resistances are secondary. With a reasonably constant electrolyte flow, uniform results are assured over a wide variety of utensil diameters.

Since the upper edge of copper is clearly defined by masks 32, the rejects due to splashing of the electrolyte and to other causes when a mask is not used are eliminated.

It is entirely practical to eliminate the top tank 45 and to depend on the excellence of design of a pump to provide uniform flow. In practice, it is found that the use of the overhead tank simplifies the installation and its operation.

While I have herein shown and described my invention in what I have conceived to be the most practical and preferred embodiment, it is recognzed that departures may be made therefrom within the scope of my invention, which is not to be limited to the details disclosed herein but is to be accorded the full scope of the claims so as to embrace any and all equivalent methods and apparatus.

Having described my invention, what I claim as new and desire to secure by Letters Patent is:

1 An apparatus for electroplating copper on the bottom and rounded bottom corner surfaces of a stainless steel cooking utensil which is cylindrical with a flat bottom having a rounded bottom corner surface comprising an electrolyte containable cylindrical plating cell open at the top and having an inside diameter greater than its depth and greater than the outside diameter of the utensil to be plated, said cell having a dielectric side wall and a bottom, provided with an upper anodic surface, an electrolyte supply pipe vertically entering said cell through the center of the bottom thereof and having a discharge terminal in said cell adjacent the bottom thereof, means to supply electrolyte through said pipe to said cell at a substantially constant velocity, means to receive electrolyte overflowing the top of said cell and to re-circulate said electrolyte through said plating apparatus, electrical connecting means for conducting plating current to said anodic surface of the cell bottom, said cell bottom being adapted to support in conductive relation a supply of anodic plating copper of irregular shape, electrical conducting means adapted to suspend the cooking utensil to be plated stationary concentricly in the upper portion of said cell whereby the bottom of said utensil to be plated is positioned at a depth below the top of the side wall whereby plating will occur to the desired height up the side wall of the utensil and to define in conjunction with the upper portion of said plating cell an annular passage, and an annular dielectric guard ring in the upper portion of said cell extending inwardly from said side wall and having a central opening less than the diameter of the flat bottom of the utensil to be plated adapted to prevent upward flow of electrolyte against said utensil except through said opening and to cause the path of travel of plating current from the anodic cell bottom to the corners of said utensil to be longer than the travel of said current to the flat bottom of the utensil.

2. An apparatus for electroplating copper on the bottom and rounded bottom corner surfaces of a stainless steel cooking utensil which is cylindrical with a substantially flat bottom having a rounded bottom corner surface comprising an electrolyte containable cylindrical plating cell open at the top and having an inside diameter greater than its depth and greater than the outside diameter of the utensil to be plated, said cell having a dielectric side wall resistant to the electrolyte used and a bottom, the entire upper surface of the bottom being anodic and consisting of a material electrically conductive and resistant to the electrolyte employed, an electrolyte supply pipe vertically entering said cell at the center of the bottom thereof and having a removable discharge terminal in said cell adjacent the bottom thereof, means to supply electrolyte through said pipe to said cell at a constant velocity, means to receive electrolyte overflowing the top of said cell, electrical connecting means for conducting plating current to said anodic cell bottom, said cell bottom being adapted to support in conductive relation a supply of anodic plating copper, electrical conducting means adapted to suspend the cooking utensil to be plated stationary concentricly in the upper portion of said cell to a depth below the top of the side wall whereby plating will occur to the desired height up the side wall of the utensil and an annular dielectric guard ring in the upper portion of said cell extending inwardly from said side wall and having a central opening not greater than the diameter of the flat bottom of the utensil to be plated adapted to prevent upward flow of electrolyte against said utensil except through said opening and to cause the path of travel of plating current from the anodic cell bottom to the corners of said utensil to be longer than the travel of said current to the flat bottom of the utensil.

3. An apparatus for electroplating copper on the bottom and rounded bottom corner surfaces of a stainless steel cooking utensil which is cylindrical with a flat bottom having a rounded bottom corner surface comprising an electrolyte containable cylindrical plating cell open at the top and having an inside diameter at least as great as its depth and greater than the outside diameter of the utensil to be plated, said cell having a dielectric side wall and a bottom, the entire upper surface of the bottom being anodic and consisting of a material electrically conductive and chemically resistant to the electrolyte employed, an electrolyte supply pipe disposed vertically through the bottom of said cell at the center thereof and having a discharge terminal in said cell adjacent the bottom thereof adapted to permit the passage of electrolyte vertically upward therefrom, means to supply electrolyte through said pipe to said cell at a constant velocity, means to receive electrolyte overflowing the top of said cell, electrical connecting means for conducting plating current to said anodic cell bottom, said cell bottom being adapted to support in conductive relation a supply of anodic plating copper, electrical conducting means adapted to suspend the cooking utensil to be plated stationary concentricly with respect to said discharge terminal and to a depth below the top of said cell side wall whereby plating will occur to the desired height up the side wall of the utensil and an annular dielectric guard ring in the upper portion of said cell extending inwardly from an in substantially fluid-tight engagement with said side wall and having a central opening less than the diameter of the flat bottom of the utensil to be plated adapted to prevent upward flow of electrolyte against said utensil except through said opening thereby to cause a radial flow of electrolyte outwardly along the bottom of said utensil to be plated and to cause the path of travel of plating current from the anodic cell bottom to the corners of said utensil to be longer than the travel of said current to the flat bottom of the utensil.

HERBERT WATERMAN.

REFERENCES CITED

The following references are of record in the file of this patent:

UNITED STATES PATENTS

| Number | Name | Date |
| --- | --- | --- |
| 519,595 | Thofehrn | May 8, 1894 |
| 1,144,680 | Allers | June 29, 1915 |
| 1,387,425 | Merritt | Aug. 9, 1921 |
| 1,543,861 | McCord | June 30, 1925 |
| 1,594,509 | Rosenquist | Aug. 3, 1926 |
| 1,603,951 | Hitchcock | Oct. 19, 1926 |
| 1,757,235 | Clark et al. | May 6, 1930 |
| 1,991,678 | Jephson | Feb. 19, 1935 |
| 2,044,415 | Yates | June 16, 1936 |
| 2,122,876 | Bitner | July 5, 1938 |
| 2,363,973 | Kennedy et al. | Nov. 28, 1944 |

FOREIGN PATENTS

| Number | Country | Date |
| --- | --- | --- |
| 21,283 | Great Britain | of 1895 |
| 312,600 | Great Britain | of 1929 |
| 117,302 | Australia | of 1943 |